US005555515A

United States Patent [19]

Tomita et al.

[11] Patent Number: 5,555,515

[45] Date of Patent: Sep. 10, 1996

[54] APPARATUS AND METHOD FOR GENERATING LINEARLY FILTERED COMPOSITE SIGNAL

[75] Inventors: Hiroyuki Tomita; Koichi Saito, both of Kanagawa-ken, Japan

[73] Assignee: Leader Electronics Corp., Kanagawa-ken, Japan

[21] Appl. No.: 278,909

[22] Filed: Jul. 22, 1994

[30] Foreign Application Priority Data

Jul. 23, 1993 [JP] Japan .................................... 5-183075

[51] Int. Cl.[6] .......................................... G06F 7/10

[52] U.S. Cl. .......................................... 364/724.01

[58] Field of Search .................................... 364/718–722, 364/724.01, 728.01, 728.02, 724.03, 724.13

[56] References Cited

U.S. PATENT DOCUMENTS

| | | | |
|---|---|---|---|
| 5,175,769 | 12/1992 | Hejna, Jr. et al. | 381/34 |
| 5,327,498 | 7/1994 | Hamon | 381/51 |
| 5,337,264 | 8/1994 | Levien | 364/724.01 |
| 5,394,473 | 2/1995 | Davidson | 381/36 |

OTHER PUBLICATIONS

Jackson, "High–Speed Convolution", Digital Filter and Signal Processing, second Edition, pp. 164–166, 1989.

*Primary Examiner*—Roy N. Envall, Jr.
*Assistant Examiner*—Chuong D. Ngo
*Attorney, Agent, or Firm*—Fish & Richardson PC

[57] ABSTRACT

An apparatus and method for generating a linearly filtered composite signal, wherein the original signal of said composite signal can be divided into a plurality of sequentially arranged original sub-signals. The apparatus having a plurality of memory ($1_1$, $1_2$) which have stored filtered sub-signals $y_1(n)$, $y_2(n)$ obtained by linearly filtering the original sub-signals, respectively; an adder (5) for adding data of the sub-signals $y_1(n)$, $y_2(n)$ read out from the memory to provide the resultant data $y_1(n)+y_2(n)$ to an output terminal of the apparatus; and a controller for controlling timings of providing the data of the sub-signals stored in the memory to the adder. The controller controls such that when a first sub-signal is to be generated, the data thereof sequentially read out from the corresponding memory are provided to the adder, thereby providing the data thereof through the adder to the output terminal, when a second sub-signal is to be generated in place of the first one, during a predetermined time period centered at a switching timing from the first sub-signal to the second one, both of data of the first and second sub-signals read out from the corresponding memory are added at the adder, thereby providing the added data to the output terminal, and thereafter, only the data of the second sub-signal read out from the second memory are provided to the adder, thereby providing the data thereof to the output terminal.

20 Claims, 10 Drawing Sheets

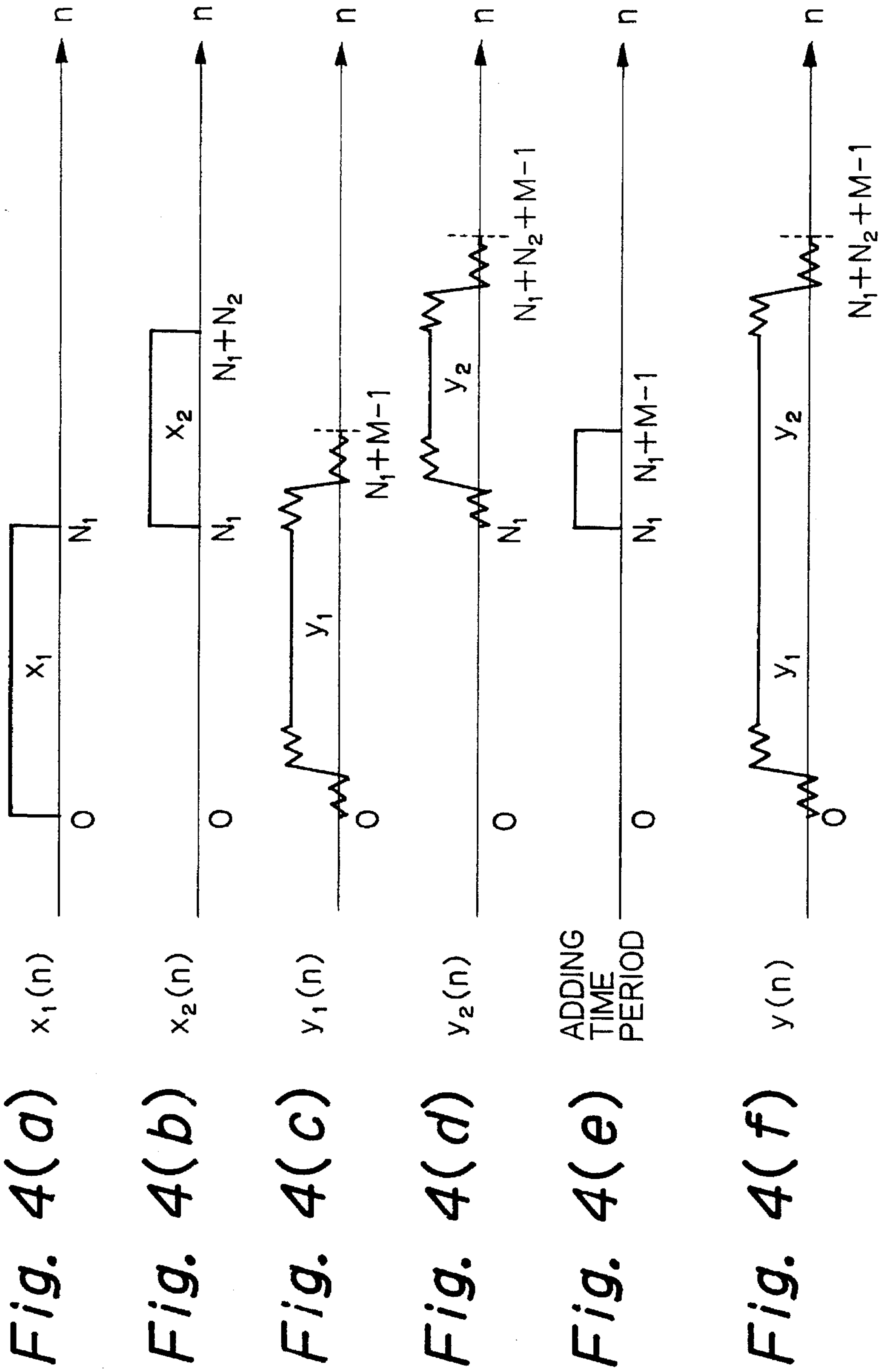
Fig. 4(a) $x_1(n)$
$x_1$
0
$N_1$
n
Fig. 4(b) $x_2(n)$
$x_2$
0
$N_1$
$N_1+N_2$
n
Fig. 4(c) $y_1(n)$
$y_1$
0
$N_1+M-1$
n
Fig. 4(d) $y_2(n)$
$y_2$
0
$N_1$
$N_1+N_2+M-1$
n
Fig. 4(e) ADDING TIME PERIOD
0
$N_1$
$N_1+M-1$
n
Fig. 4(f) y(n)
$y_1$
$y_2$
0
$N_1+N_2+M-1$
n x(n)
D(≧M−1)
x₁
x₂
0
N₁
N₁+D
N₁+N₂+D
n y(n)
y₁
y₂
0
N₁+M−1
N₁+D
N₁+N₂+D+M−1
n x(n)
D(<M−1)
x₁
x₂
0
N₁
N₁+D
N₁+N₂+D
n y₁(n)
y₁
0
N₁+M−1
n y₂(n)
y₂
0
N₁+D
N₁+N₂+D+M−1
n ADDING TIME PERIOD
0
N₁+D
N₁+M−1
n y(n)
y₁
y₂
0
N₁+N₂+D+M−1
n Fig. 10
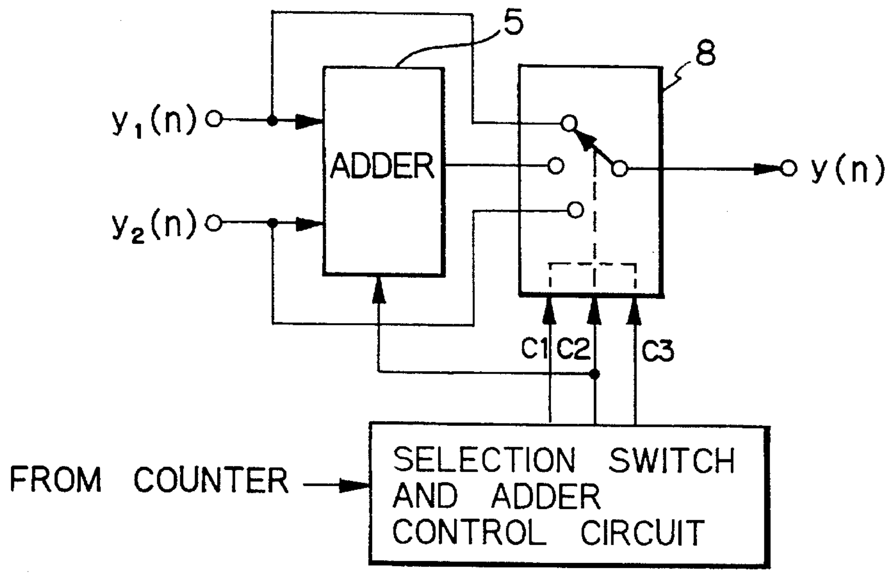
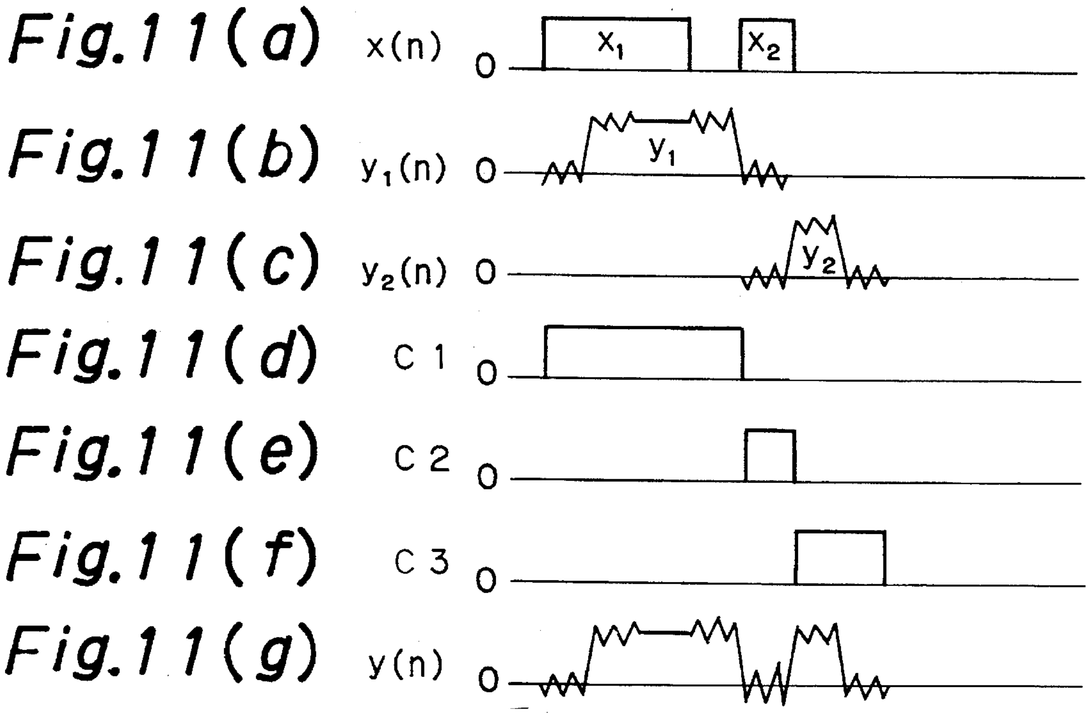

APPARATUS AND METHOD FOR GENERATING LINEARLY FILTERED COMPOSITE SIGNAL

BACKGROUND OF THE INVENTION

1. Field of the Invention

The present invention relates to an apparatus and method for generating a filtered composite signal obtained by linearly filtering an original composite signal which can be divided into a plurality of sequentially arranged sub-signals, and more particularly to a apparatus and method for generating a composite signal by selectively reading out linearly filtered sub-signals previously stored in memories after linearly filtering an original composite signal, which can be divided into a plurality of sequentially arranged sub-signals, and by combing the sub-signals to output.

2. Description of Prior Arts

In a conventional prior art, such an original composite signal as above is treated with a linear filter in advance of being stored in a memory such as a ROM, and is read out from the memory when the filtered composite signal is to be output.

Referring to FIG. 1, a conventional signal generator as mentioned above will be described below. In FIG. 1, reference numeral 1 denotes a memory, reference numeral 2 a pattern selecting circuit, reference numeral 3 a counter, and reference numeral 4 a clock generating circuit. In the conventional signal generator, the original composite signal containing a plurality of original sub-signals in series is not divided and is treated as a unit with a linear filter before storage in the memory 1. Further each of the sub-signals of the composite signal is a selected one of a plurality of kinds, in other words, a plurality of patterns. Accordingly, the memory 1 stores a plurality of filtered composite signals as unit.

When one of the filtered composite signals is generated, higher (or upper) bits of the addresses of the memory 1 are assigned by the pattern selecting circuit 2 in accordance with the filtered composite signal to be generated, while the remaining lower bits of the addresses of the memory 1 are sequentially assigned by the counter 3 for counting clocks from the clock generating circuit 4, whereby data or the components of the filtered composite signal are sequentially read out from the memory 1.

In the conventional signal generator, assuming that the original composite signal constitutes of two sub-signals respectively containing $I_1$ and $I_2$ patterns, the total number of the composite signals is $I_1 \times I_2$. The memory 1 thus needs a capacity sufficient to store data samples of $I_1 \times I_2$ composite signals.

To describe this in details with reference to FIG. 2, assuming that as shown in FIG. 2(*a*), an original composite signal x(n) [n: sampling timing] or an input signal to a linear filter (not shown) is expresses as a combination of sub-signals $x_1(n)$ and $x_2(n)$; $x(n)=x_1(n)+x_2(n)$, namely $$x(n)=x_1(n) \text{ when } n=O-N_1-1, \text{ and}$$

$$x(n)=x_2(n) \text{ when } n=N_1-N_1+N_2-1$$

In this case, a filtered composite signal y(n) or output signal from the linear filter is shown as in FIG. 2(*b*). In order to make the description simple, it is assumed that the linear filter used is a linear phase finite impulse response (FIR) digital filter having M taps and that the group delay is t. In a case where the filtered output signal y(n) is stored in the memory 1, the number $S_1$ of data samples is expressed as follows;

$$S_1=(N_1+N_2)+(M-1) \quad (1)$$

Therefore, a memory capacity is needed which is sufficient to store at least data equal to the $S_1$ samples. In Expression (1), (M−1) is, as shown in FIG. 2(*b*), data newly generated by virtue of the filter treatment.

In addition, in a case where $x_1(n)$ and $x_2(n)$ of the input signal have $I_1$ and $I_2$ changeable patterns, respectively, the number of combinations resulting from those patterns becomes $I_1 \times I_2$, and therefore in order to store all of the output signals y(n) that have been linear-filter-treated, the number $S_1$ of samples is represented by Expression (2);

$$S_1=I_1 \times I_2\{(N_1+N_2)-(M-1)\} \quad (2)$$

Thus, is is necessary for the memory 1 to have a capacity obtained by multiplying the capacity in the case that each of the patterns of the sub-signals is only one, by $I_1 \times I_2$.

Moreover, when the values of $I_1$ and $I_1$ increase, a memory capacity is required to be extremely large, because the number $S_1$ of samples is proportional to the product of those values. Thus, the conventional signal generator is required to include a memory having a huge storage capacity.

Accordingly, an object of the present invention is to provide an apparatus and method for generating a linearly filtered composite signal which can use a memory having a capacity that is not so large as the one required by a prior art, thereby eliminating problems inherent in the prior art.

SUMMARY OF THE INVENTION

In order to attain the above object, the main feature of the present invention resides in that sub-signals of the original composite signals are respectively treated with a linear filter and then stored in advance in separate memory means associated with the respective sub-signals, and that when a linearly filtered composite signal is to be generated, the sorted filtered sub-signals are read out sequentially from the memory means and the signals read out from a first memory means and the next memory means are added at adding means during a certain period centered at output switching time from the first filtered sub-signal to the second filtered sub-signal.

According to an embodiment of the present invention, by controlling read out timings of the memory means, when the first filtered sub-signal is to be generated as an output composite signal, only the first memory means is accessed to read out the signal, when the output signal to be changed from the first filtered sub-signal to the second one, during the certain time period both of the first and second memory means are accessed to read out the signals and then the read out signals are added, and thereafter only the second memory means is accessed to read out the second filtered sub-signal.

In another embodiment of the present invention, by storing zero data in predetermined addresses of the respective memory means, the respective memory means are accessed by the same address signals to simultaneously read out the sub-signals including zero data therefrom and the read out sub-signals are added by the adding means to provide the filtered composite signal.

In a further embodiment of the present invention, by repeatedly and simultaneously reading out the filtered sub-signals from the respective memory means and by incorporating transfer gate means for selectively transferring the filtered sub-signals from the memory means to the adding means such that when the first filtered sub-signal is to be generated as an output signal, only the first filtered sub-signal passes therethrough to the adding means, when the output signal is to be changed from the first filtered sub-signal to the second one, both of the first and second filtered sub-signals are transferred to the adding means during a certain period centered at the switching timing, and thereafter only the second filtered sub-signal is transferred to the adding means, whereby the filtered composite signal as the output signal is provided from the adding means.

In the above embodiments of the present invention, in a case where at least one of the plurality of sub-signals contains a plurality of patterns, namely the pattern of the sub-signal is changeable, it is designed that the pattern is selected by assigning higher or upper bits of addresses of the corresponding memory means. In addition, in the case where each of the memory mean is constituted by a plurality of memories so as to correspond to the plurality of patterns, it may be designed to incorporate selecting means for selectively passing one of the read out sub-signals from the memory means to the adding means.

Further, in the above embodiments of the present invention, the adding means may be controlled to become active only during a certain period centered at the sub-signal switching time, and the read out sub-signal or sub-signals from the memory means may be directly provided to the output terminal during the other time period of a composite signal generation.

BRIEF DESCRIPTION OF THE DRAWINGS

FIGS. 4(*a*)–4(*f*) are explanatory waveform charts explaining the principle of the present invention;

FIG. 10 is a block diagram showing a further embodiment of the present invention; and FIGS. 11(*a*)–11(*g*) are explanatory waveform charts explaining an operation of the embodiment shown in FIG. 10.

DESCRIPTION OF THE PREFERRED EMBODIMENTS

Figure 1:
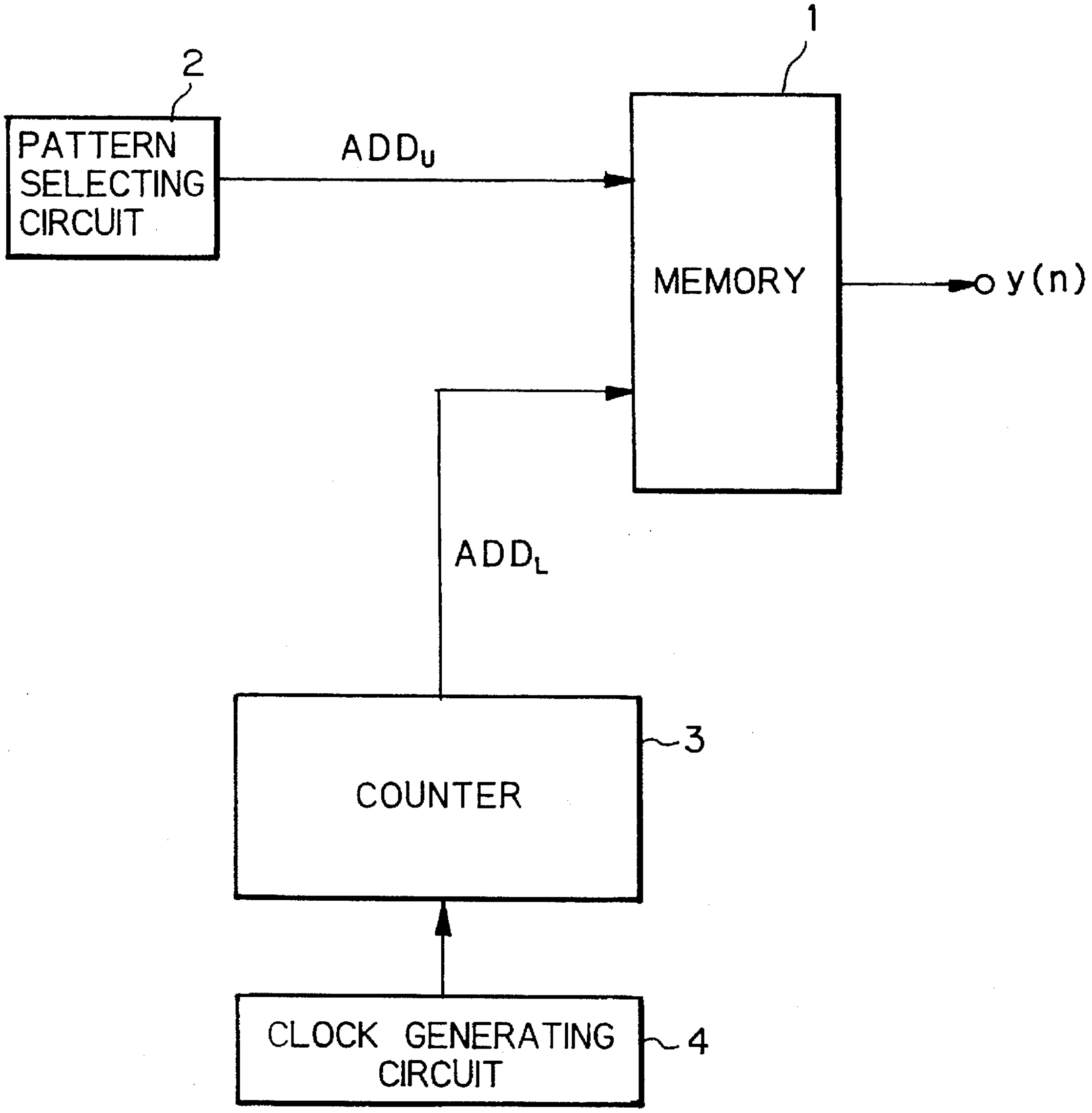
Fig. 1 (PRIOR ART)
FIG. 1 is a block diagram showing a constitution of a prior art linearly filtered composite signal generator.
Figures 2A, 2B:
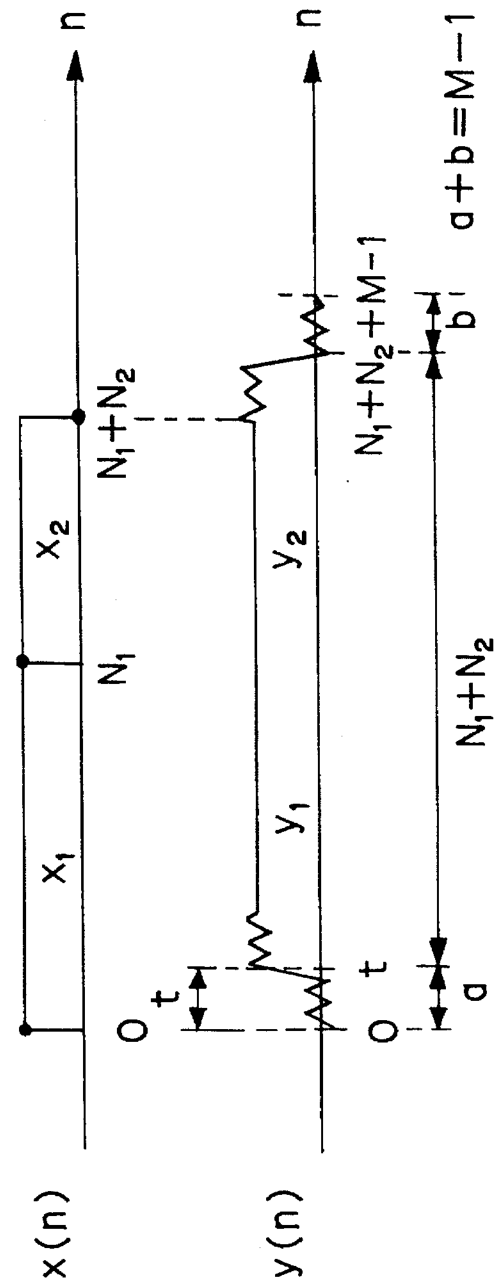
Fig. 2(a) (PRIOR ART)
Fig. 2(b) (PRIOR ART)
FIGS. 2(*a*) and 2(*b*) are explanatory waveform charts explaining an operation of the prior art.

FIG. 1 shows a linearly filtered composite signal generator according to an embodiment of the present invention. In FIG. 1, reference numerals $\mathbf{1}_1$ and $\mathbf{1}_2$ denote memories for storing sub-signals each of which has been treated with a linear filter, and reference numerals $\mathbf{2}_1$ and $\mathbf{2}_2$ denote pattern selecting circuits for selecting upper bits of addresses of the memories $\mathbf{1}_1$ and $\mathbf{1}_2$ in accordance with patterns of the sub-signals to be generated, and thus the pattern selecting circuits $\mathbf{2}_1$ and $\mathbf{2}_2$ respectively constitute upper address generating means. Reference numeral 3 denotes a counter for sequentially generating lower bits of the addresses of the memories $\mathbf{1}_1$ and $\mathbf{1}_2$, and reference numeral 4 a clock generating circuit for supplying clocks to the counter 3. The counter 3 and the clock generating circuit 4 constitute a lower address generating means. Reference numeral 5 denotes an adder for adding signals read out from the memories $\mathbf{1}_1$ and $\mathbf{1}_2$.

Prior to explaining an operation of the present invention, the principle thereof will be described with reference to FIGS. 2 through 6. As will be clear from the following description, since the present invention can be established if linearity is maintained by a filter treatment, any linear filter means such as an analog filter, IIR filter, and FIR filter may be utilized in the present invention.

It is assumed that an input signal x(n) of a linear filter is expressed by a sum of two succeeding sub-signals $x_1(n)$ and $x_2(n)$. In other words, the input signal is a composite signal represented as follows:

$$x(n)=x_1(n)+x_2(n) \tag{3}$$

Since these two sub-signals $x_1(n)$ and $x_2(n)$ are present only for a specific time period, they can be divided as shown in FIGS. 4(*a*) and 4(*b*). When these signals are respectively treated with a linear filter having M taps, output sub-signals $y_1(n)$ and $y_2(n)$ of the linear filter can be obtained as shown in FIGS. 4(*a*) and 4(*b*).

In general, assuming that the coefficient of a M-tap linear filter is h(0)–h(M−1), an output signal y(n) is generally expressed using an input signal x(n) as follows:

$$y(n)=\sum_{1=o}^{M-1} h(i)\,x(n-i) \tag{4}$$

As is clear from Equation (4), the output signal y(n) is expressed as a constant coefficient linear difference equation. Accordingly, the signal can maintain linearity even after it is treated with linear filter, and thus when the input signal x(n) is expressed by the sum of two sub-signals $x_1(n)$ and $x_2(n)$, then the output signal y(n) can also be expressed by an addition of sub-signals $y_1(n)$ and $y_2(n)$ these are respectively obtained by linearly filtering the sub-signals $x_1(n)$ and $x_2(n)$, and thus the following Expression is obtained:

$$y(n)=y_1(n)+y_2(n) \tag{5}$$

As is apparent, there is a period of time when at least one of the output or filtered sub-signal $y_1(n)$ and $y_2(n)$ is 0 (zero), and in such a period, it may not be necessary to add both sub-signals $y_1(n)$ and $y_2(n)$. Thus, as shown in FIG. 4(*e*), an addition is made only during a predetermined time period centered at signal switching timing from the sub-signal $y_1(n)$ to the sub-signal $y_2(n)$, and only a sub-signal that is not 0 may be output during the other period of time, whereby an output signal y(n) similar to that in a prior art as described above can be obtained as shown in FIG. 4(*f*). This is expressed by Equations (6)–(8) below:

When $n<N_1$ $$y(n)=\sum_{1=o}^{M-1} h(i)\, x_1(n-i) \qquad (6)$$

When $N_1 \leqq n < N_1+M-1$ $$y(n)=\sum_{i=n-N1+1}^{M-1} h(i)\, x_1(n-i)+\sum_{1=o}^{n-N1} h(i)\, x_2(n-i) \qquad (7)$$

When $N_1+M-1 \leqq n$ $$y(n)=\sum_{1=o}^{M-1} h(i)\, x_2(n-i) \qquad (8)$$

As is clear from Equations (6) and (8), at periods of time when $n<N_1$ and $N_1+M-1 \leqq n$ since one of the sub-signals $y_1(n)$ and $y_2(n)$ is 0, only the other sub-signal is outputted, and as is clear from Equation (7), an addition operation is made only at a period of time when $N_1 \leqq n < N_1+M-1$.

Calculating data volume of the sub-signals $y_1(n)$ and $y_2(n)$, the number of samples for the sub-signal $y_1(n)$ is equal to $N_1+M-1$, and that for the sub-signal $y_2(n)$ is equal to $N_2+M-1$. Consequently, the number $S_2$ of total samples is expressed as below:

$$S_2=(N_1+M-1)+(N_2+M-1) \qquad (9)$$

In the case where the input sub-signals $x_1(n)$ and $x_2(n)$ have changeable $I_1$ and $I_2$ patterns, the number $S_2$ of total samples is as follows:

$$S_2=I_1(N_1+M-1)+I_2(N_2+M-1) \qquad (10)$$

This means that a memory having a capacity capable of storing the data of the $S_2$ samples.

Thus, according to the conventional art, data of the $S_1$ samples expressed by Equation (2) is required to be stored, while according to the present invention, only data of the $S_2$ samples represented by Equation (10) may be stored, thereby making it possible to reduce the memory capacity required. When the number of patterns of the input sub-signals $x_1(n)$ and $x_2(n)$ increase, the values of $I_1$ and $I_2$ correspondingly increase and the greater the extend to which memory capacity can be saved. In this case, even when either of $I_1$ and $I_2$ is equal to 1, it is clear that the same effect can be obtained.

Although the case where the input signal x(n) can be divided into two sub-signals $x_1(n)$ and $x_2(n)$ is described above, it is possible to reduce the memory capacity even when the input signal is divided into more than two, for instance, into sub-signals $x_1(n)$, $x_2(n)$, . . . , $x_m(n)$. In this case, the number $S_2$ of total samples is expressed as follows:

$$\begin{aligned} S_2 &= I_1(N_1+M-1)+I_2(N_2+M-1)+ \\ &\quad \ldots + I_m(N_m+M-1) \\ &= \sum_{i=1}^{m} I_i(N_i+M-1) \end{aligned} \qquad (11)$$

On the other hand, in the case where the output signal y(n) is stored in the memory without being divided into sub-signals as in the prior art, the number $S_1$ of total samples is expressed as follows:

$$\begin{aligned} S_1 &= (I_1 I_2 \ldots I_m)\{(N_1+N_2+\ldots+N_m)+(M-1)\} \\ &= (I_1 I_2 \ldots I_m)(N_1+M-1) \\ &\quad +(I_1 I_2 \ldots I_m)(N_2) \\ &\quad +(I_1 I_2 \ldots I_m)(N_5) \\ &\quad \cdot \\ &\quad \cdot \\ &\quad \cdot \\ &\quad +(I_1 I_2 \ldots I_m) N_m \\ &= \prod_{j=1}^{m}\left(\sum_{i=1}^{m} N_i+M-1\right) \end{aligned} \qquad (12)$$

As is apparent from the above, in a case where the number m of sub-signals of an input signal x(n) increases, the memory capacity can further be saved in comparison with the prior art.

For the purpose of comparison between the subject case and the prior case, assuming $N_1=N_2=N_3=\ldots=N_m=N$, $I_1=I_2=I_3=\ldots=I_m I$, and $N \gg M$, the number $S_1$ of total samples in the prior art is expressed as follows:

$$\begin{aligned} S_1 &= (I_1 I_2 \ldots I_m)\{N_1+N_2+\ldots+N_m+(M-1)\} \\ &= (I^m)\{(m\,N)+(M-1)\} \\ &\approx m\, I^m N \end{aligned} \qquad (13)$$

On the other hand, the number $S_2$ of total samples in the present invention is expressed as follows:

$$\begin{aligned} S_2 &= I_1(N_1+M-1)+I_2(N_2+M-1)+ \\ &\quad \ldots I_m(N_m+M-1) \\ &= I_1 N_1+I_2 N_2+\ldots+I_m N_m+m(M-1) \\ &\approx m\,I\,N \end{aligned} \qquad (14)$$

Dividing $S_2$ by $S_1$, $$\begin{aligned} S_2/S_1 &= (m\,I\,N)/(m\,I^m N) \\ &= 1/I^{m-1} \end{aligned} \qquad (15)$$

Equation (15) represents that when the number of sub-signals of the input signal is m and each sub-signal has I selectable patterns, the memory capacity of the present invention can be as small as $1/I^{m-1}$ of that of the prior art.

An example has been given heretofore in which a signal can be divided into sub-signals in a one-dimensional fashion. However, the same can be applied to a case where a signal is divided into a plurality of sub-signals in a two-dimensional fashion. An explanation of such a case will be made below.

It is assumed that an input signal $x(n_1, n_2)$ in two-dimension can be separated into sub-signals $x_1(n_1, n_2)$ and $x_2(n_2, n_2)$ as shown in FIG. 5(*a*), and is expressed as follows:

When $n_1=0-(N_{11}-1)$, and $n_2=0-(M_{21}-1)$ $x(n_1, n_2)=x_1(n_1, n_2)$

When $n_1=N_{11}-(N_{11}+N_{12}-1)$, and $n_2=N_{2d}-(N_{2d}+N_{22}-1)$ $$x(n_1, n_2)=x_2(n_1, n_2)$$

If the input signal $x(n_1, x_2)$ not divided into the sub-signals is treated with an FIR filter having $M_1 \times M_2$ taps, an output signal $y(n_1, n_2)$ is obtained as shown in FIG. 5(*b*). When storing this filtered output signal $y(n_1, n_2)$ in a memory, the number $S_1$ of samples in the prior art is expressed as follows:

$$S_1=(N_{11}+M_1-1)\,(N_{21}+M_2-1)+(N_{12}+M_1-1)\,(N_{22}+M_2-1)-\alpha \qquad (16)$$

It is needed a memory capacity which can store data of $S_1$ samples. In Equation (16), $\alpha$ denotes an adding time period that will be described later.

In the case, when there are present $I_1$ and $I_2$ selectable patterns in the input sub-signals $x_1(n_1, n_2)$ and $x_2(n_1, n_2)$, respectively, in order to store all kind of the filtered output signals $y(n_1, n_2)$, a memory capacity sufficient to store data of $S_1$ samples wherein $S_1$ is expressed as follows:

$$S_1=I_1 I_2\{(N_{11}+M_1-1)\,(N_{21}+M_2-1)+(N_{12}+M_1-1)\,(N_{22}+M_2-1)-\alpha\} \qquad (17)$$

Furthermore, when the number of sub-signals of the input signal increases and the input signal can be divided into $x_1(n_1, n_2)$, $x_2(n_1, n_2)$, . . . $x_m(n_1, n_2)$, in the prior art, the number $S_1$ of samples to be stored is expressed as follows:

$$\begin{aligned} S_1 &= (I_1 I_2 \ldots I_m)\{(N_{11}+M_1-1)(N_{21}+M_2-1) \\ &\quad + (N_{12}+M_1-1)(N_{22}+M_2-1) \\ &\quad \vdots \\ &\quad + (N_{1m}+M_1-1)(N_{2m}+M_2-1)-\alpha\} \\ &= \prod_{j=1}^{m} I_j \left\{ \sum_{i=1}^{m} (N_{1i}+M_1-1)(N_{2i}+M_2-1)-\alpha \right\} \end{aligned} \qquad (18)$$

In contrast, in the present invention, the input signal $x(n_1, n_2)$ is divided into the sub-signals $x_1(n_1, n_2)$ and $x_2(n_1, n_2)$ and they are separately treated with a linear-filter having taps of $M_1 \times M_2$ to obtain output sub-signals $y_1(n_1, n_2)$ and $y_2(n_1, n_2)$ shown in FIG. 5(*c*). Assuming that the coefficient of the filter of $M_1 \times M_2$ taps is $h(i, j)$, where $i=0, 1, 2, \ldots, (M_1-1)$, and $j=0, \ldots, (M_2-1)$, an output signal $y(n_1, n_2)$ is generally expressed as follows:

$$y(n_1, n_2) = \sum_{j=o}^{M2-1} \sum_{i=o}^{M1-1} h(i,j)\, x(n_1-i, n_2-j) \qquad (19)$$

Even if the signal is two-dimensional, the output signal is represented by a constant coefficient linear difference equation as Equation (19). Therefore, similar to the case of the one-dimensional signal, by adding the output sub-signals $y_1(n_1, n_2)$ and $y_2(n_1, n_2)$ as shown in FIG. 5(*c*), an output signal $y(n_1, n_2)$ as shown in FIG. 5(*d*) is obtained and is the same as that of the prior art shown in FIG. 5(*b*). A time period for adding is indicated by a thick solid lines in FIG. 5(*d*) where the output sub-signals $y_1(n_1, n_2)$ and $y_2(n_1, n_2)$ co-exist. This adding time period corresponds to the $\alpha$ in Equation (17).

The number $S_2$ of total samples in the case as shown in FIG. 5 according to the present invention is expressed as follows:

$$S_2=(N_{11}+M_1-1)\,(N_{21}+M_2-1)+(N_{12}+M_1-1)\,(N_{22}+M_2-1) \qquad (20)$$

In the case where there are $I_1$ and $I_2$ selectable patterns of input signals $x_1(n_1, n_2)$ and $x_2(n_1, n_2)$, respectively, the number $S_2$ of total samples is expressed as follows:

$$S_2=I_1(N_{11}+M_1-1)\,(N_{21}+M_2-1)+I_2(N_{12}+M_1-1)\,(N_{22}+M_2-1) \qquad (21)$$

Furthermore, in the case where the number of sub-signals is increased, that is, the input signal is capable of dividing into sub-signals $x_1(n_1, n_2)$, $x_2(n_1, n_2)$, . . . , $x_m(n_1, n_2)$, the number $S_2$ of total samples is expressed as follows:

$$\begin{aligned} S_2 &= I_1(N_{11}+M_1-1)(N_{21}+M_2-1) \\ &\quad + I_2(N_{12}+M_1-1)(N_{22}+M_2-1) \\ &\quad \vdots \\ &\quad + I_m(N_{1m}+M_1-1)(N_{2m}+M_2-1) \\ &= \sum_{1=i}^{m} I_1 (N_{1i}+M_1-1)(N_{21}+M_2-1) \end{aligned} \qquad (22)$$

For instance, assuming the following relations;

$$N_{11}=N_{12}=N_{13}= \ldots =N_{1m}=N_1$$

$$N_{21}=N_{22}=N_{23}= \ldots =N_{2m}=N_2$$

$$I_1=I_2=I_3= \ldots =I_m=I$$

$$M_1 \ll N_1,\ M_2 \ll N_2,\ \alpha \ll N_1 N_2$$

the number $S_1$ of samples in the prior art and the number $S_2$ of samples in the present invention are respectively expressed by Equations (23) and (24):

$$\begin{aligned} S_1 &= (I_1 I_2 \ldots I_m)\{(N_{11}+M_1-1)(N_{21}+M_2-1) \\ &\quad + (N_{12}+M_1-1)(N_{22}+M_2-1) \\ &\quad \vdots \\ &\quad + (N_{1m}+M_1-1)(N_{2m}+M_2-1)-\alpha\} \\ &= (I^m)\{(mN_1 N_2)-\alpha\} \\ &\approx m\, I^m N_1 N_2 \end{aligned} \qquad (23)$$

$$\begin{aligned} S_2 &= I_1(N_{11}+M_1-1)(N_{21}+M_2-1) \\ &\quad + I_2(N_{12}+M_1-1)(N_{22}+M_2-1) \\ &\quad \vdots \\ &\quad + I_m(N_{1m}+M_1-1)(N_{2m}+M_2-1) \\ &\approx m\, I\, N_1 N_2 \end{aligned} \qquad (24)$$

When $S_2$ is divided by $S_1$, $$S_2/S_1=(m\, I\, N_1\, N_2)/(m\, I^m\, N_1\, N_2)=1/I^{m-1} \qquad (25)$$

Accordingly, in the case where the number of sub-signals of the input signal is m, each sub-signal having I selectable patterns, the memory capacity of the present invention can be saved to as small as $1/I^{m-1}$ of that of the prior art.

As is described above, it is clear that even for the two-dimensional signal, according to the present invention, it is possible to save memory capacity in comparison with the prior art, and that similarly even for a signal of more than one-dimension, the present invention makes it possible to save memory capacity.

Figures 6A, 6B, 6C, 6D, 6E, 6F, 6G:
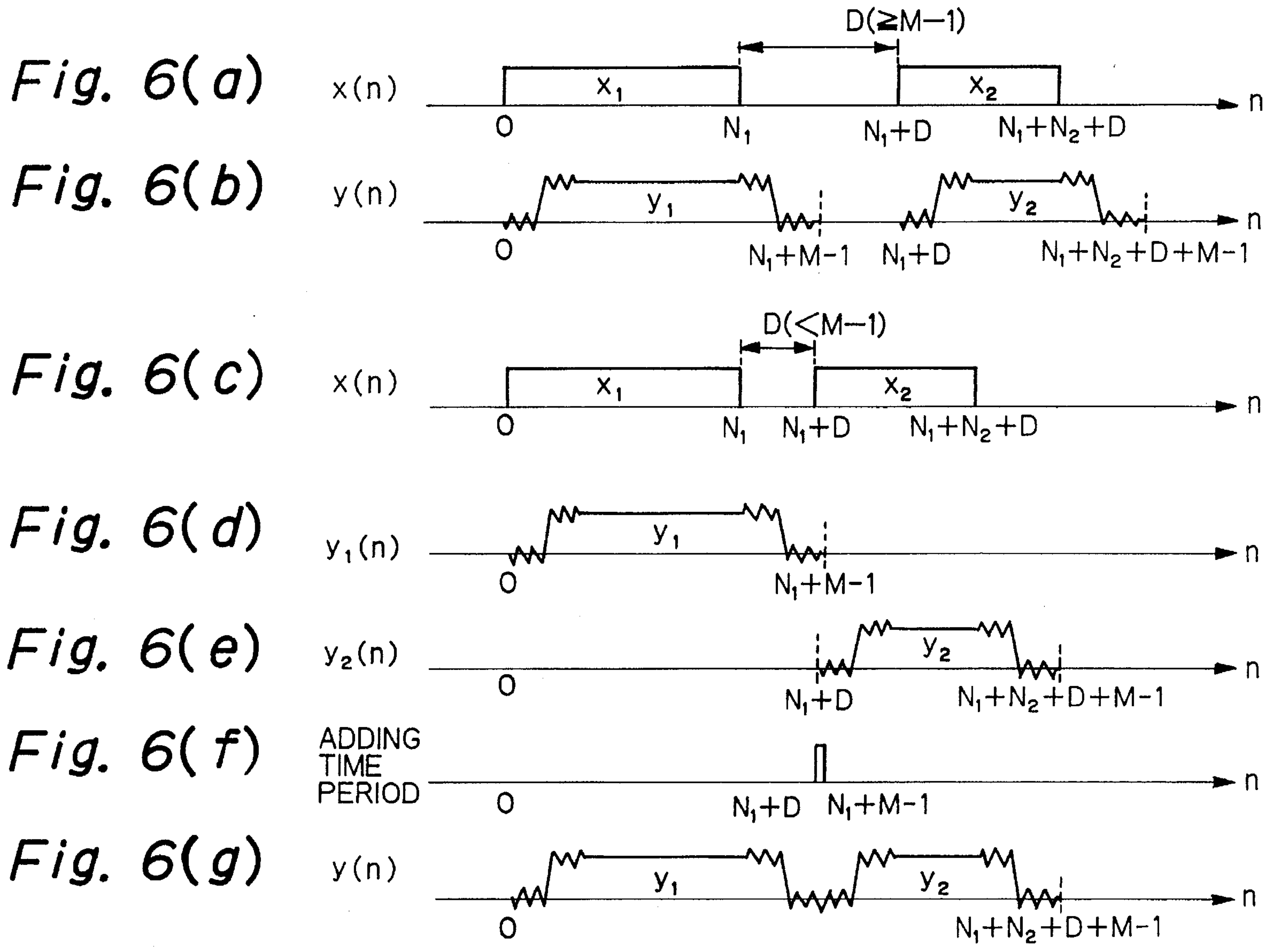
FIGS. 6(*a*)–6(*g*) are explanatory waveform charts explaining a case where the present invention is applied to a generator of linearly filtered composite signal including a short intervals between sub-signals.

Although in the above descriptions it is assumed that the input sub-signal $x_1(n)$ is switched to the input signal $x_2(n)$ abruptly, the present invention can also be applied to a case where an interval D less than a predetermined time period is present between the input succeeding sub-signals. Assuming that the number of taps of the linear filter is M, when the interval D is larger than M−1 ($D \geqq M-1$) as shown in FIG. 6(*a*), there is also present a boundary between the output sub-signals $y_1(n)$ and $y_2(n)$ as shown in FIG. 6(*b*), and therefore, the combination of the output sub-signals $y_1(n)$ and $y_2(n)$ which are obtained by linearly filtering the input sub-signals $x_1(n)$ and $x_2(n)$, respectively, is the same as the output signal y(n) which is obtained by linearly filtering the input signal x(n) as a unit. Accordingly, an adding operation around the sub-signal switching timing is not needed.

However, when $D<M-1$ as shown in FIG. 6(*c*), since there is generated no boundary between the output sub-signals $y_1(n)$ and $y_2(n)$ as shown in FIGS. 6(*d*) and 6(*e*), the merely switching operation cannot provide the same output signal as y(n) obtained by linearly filtering the input signal x(n) as a unit signal. In this case, if the adding operation according to the present invention is used, the correct output signal y(n) that is the same as in prior art can be provided as shown in FIG. 6(*g*), under the less memory capacity in comparison with the prior art. In addition, according to the present invention, it is obvious that a memory capacity can be reduced even when the input signal is in any dimensions and an interval less than a certain time period defined by the number M of taps of the linear filter is present between adjacent sub-signals of the input signal.

Now going back to FIG. 3, the embodiment of the present invention will be described in detail. In accordance with the sub-signals to be generated, either of the pattern selecting circuit $\mathbf{2}_1$ or $\mathbf{2}_2$ is rendered active. Initially, the pattern selecting circuit $\mathbf{2}_1$ corresponding to the first output sub-signal $y_1(n)$ becomes active, and provides a upper address signal $ADD_{U1}$, that is a pattern selecting signal for addressing upper bits of an address of the memory $\mathbf{1}_1$ to select one of the patterns of the sub-signals $y_1(n)$. At the same time, the counter 3 starts to count clocks from the clock generating circuit 4, and supplies sequential lower address signals $ADD_L$ to the memories $\mathbf{1}_1$ and $\mathbf{1}_2$. The lower address signal is for addressing lower bits of an address each of the memories $\mathbf{1}_1$, $\mathbf{1}_2$. In this state, data of only the sub-signal $y_1(n)$ are sequentially read out from the memory $\mathbf{1}_1$ because there is no upper address signal $ADD_{U2}$ to the memory $\mathbf{1}_2$, so that the signal line from the memory $\mathbf{1}_2$ to the adder 5 is kept 0. The sub-signal $y_1(n)$ from the memory $\mathbf{1}_1$ is thus output through the adder 5 as a portion of an output composite signal y(n).

When the sub-signal switching timing is drawing, the pattern selecting circuit $\mathbf{2}_2$ is also put in an active condition at a timing when a time period corresponding to the length of a sub-signal $x_1(n)$, from which the sub-signal $y_1(n)$ was obtained by linearly filtering, has passed from the read out starting timing of the memory $\mathbf{1}_1$, and a upper address signal (or pattern selecting signal) $ADD_{U2}$ is output to assign upper address bits of the memory $\mathbf{1}_2$, and data of the sub-signals $y_2(n)$ are also sequentially read out from the memory $\mathbf{1}_2$. Then, data read out from both of the memories are added at the adder 5 to provide the added signals as a portion of the output composite signal y(n).

Thereafter, after a lapse of a predetermined time from the activation timing of the second memory $\mathbf{1}_2$ which is proportional to M−1 (M; the number of taps of the linear-filter), the pattern selecting circuit $\mathbf{2}_1$ is put back in a non-active condition, and thus only sub-signals $y_2(n)$ from the memory $\mathbf{1}_2$ are output from the adder 5 as a portion of the output composite signal y(n). These operation timings are controlled by a control circuit (not shown).

In the above embodiment, it is constructed such that outputs from the counter 3 are commonly supplied to the memories $\mathbf{1}_1$ and $\mathbf{1}_2$. However, separate counters may be provided so as to start counting synchronously with the activation timings of the pattern selecting circuits $\mathbf{2}_1$ and $\mathbf{2}_2$, respectively. In this case, it is natural that the sub-signals $y_2(n)$ have to be stored at addresses of the memory $\mathbf{1}_2$ different to those in the case where there is one counter.

Also in the above embodiments, the read out timings from the memories $\mathbf{1}_1$ and $\mathbf{1}_2$ are controlled such that the sub-signals $y_1(n)$ and $y_2(n)$ are started to be supplied to the adder 5 at the predetermined timings. Instead of controlling the read out timings as above, it may be constructed to read out data from the memories $\mathbf{1}_1$ and $\mathbf{1}_2$, simultaneously. For performing the simultaneously reading, the 0 level data are stored as well as the sub-signals $y_1(n)$ and $y_2(n)$ in the memories $\mathbf{1}_1$ and $\mathbf{1}_2$. That is, the memories $\mathbf{1}_1$ and $\mathbf{1}_2$ have respectively stored signals comprising of the valid sub-signals $y_1(n)$ and $y_2(n)$ and the 0 level data in order as shown in FIGS. 4(*c*) and 4(*d*), wherein the 0 level data correspond to the part after $N_1+M-1$ shown in FIG. 4(*c*) and the parts before $N_1$ and after $N_1+N_2+M-1$ shown in FIG. 4(*d*). Accordingly, when the signals are read out from these memories simultaneously at the same timing, the adder 5 can outputs the composite signal y(n) as shown in FIG. 4(*f*).

In this case, if a circuit for subtracting or adding a predetermined constant from or to the lower address $ADD_L$ output from the counter 3 is inserted, the respective valid sub-signals $y_1(n)$ and $y_2(n)$ (not 0 level) can be stored from the same commencement address (for instance, from address 0).

In the modifications wherein the 0 level data have been also stored in the memories, since addresses for storing the 0 level data are required, the degree of memory capacity saving effect is smaller than that in the aforementioned case wherein no 0 level data has been stored, though read out control from the memories is made more simple than the latter. However, in a case where the number of selectable patterns in a sub-signals is three or more, it is possible to realize a saving of memory capacity in comparison with the prior art as shown in FIG. 1.

In either of the above-mentioned cases, the counter 3 may comprise a ring counter so that the linearly filtered composite signal y(n) can repeatedly be generated from the adder 5. Moreover, in a case where the number of sub-signals is three or more, it is natural that the number of sets of the pattern selecting circuits and memories needs to be increased correspondingly, and further the adding circuit needs to be made to add all the sub-signals read out from the memories.

Figure 7:
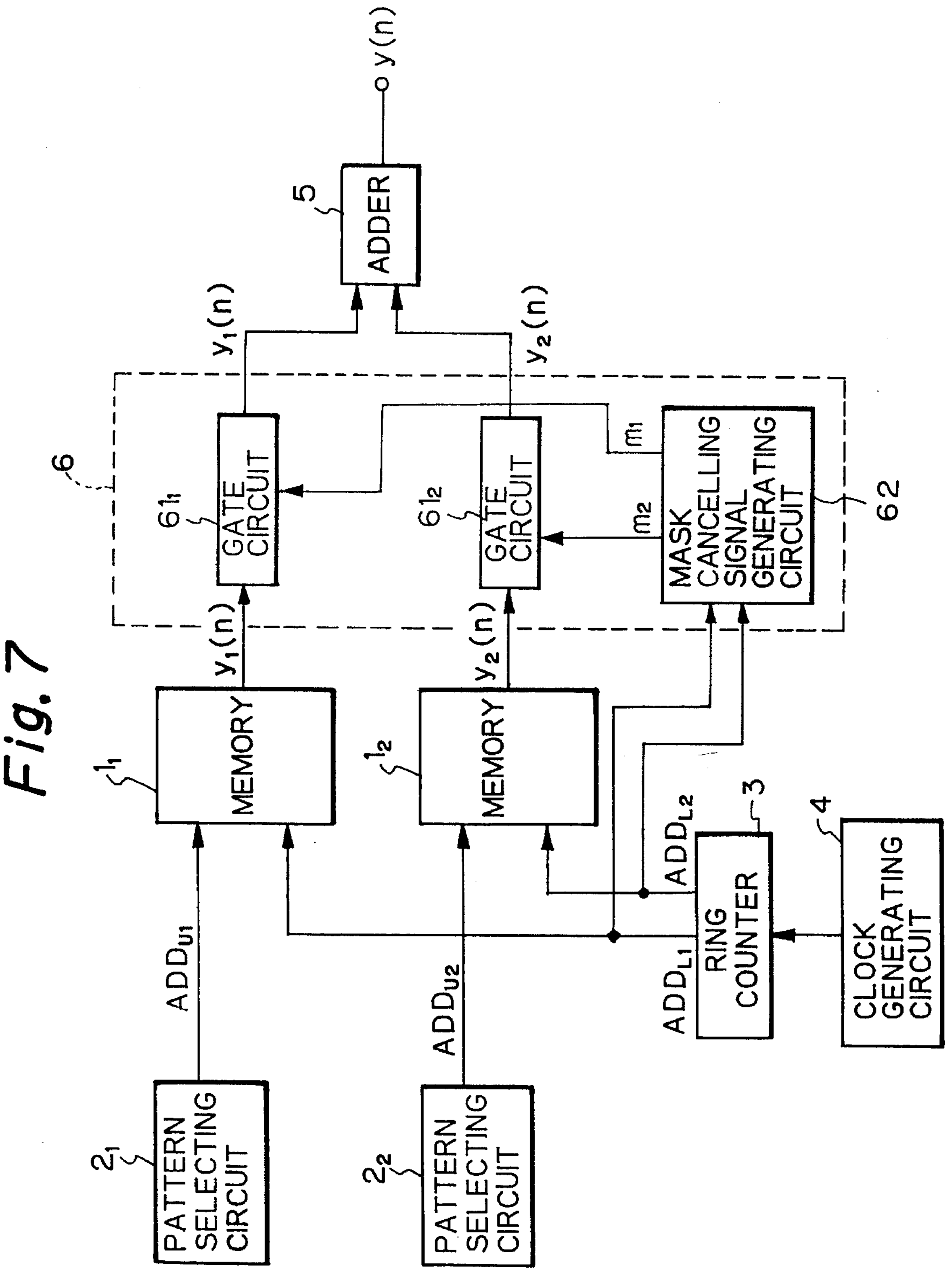
FIG. 7 is a block diagram showing a constitution of another embodiment of the present invention.
Figures 8A, 8B, 8C, 8D, 8E, 8F, 8G:
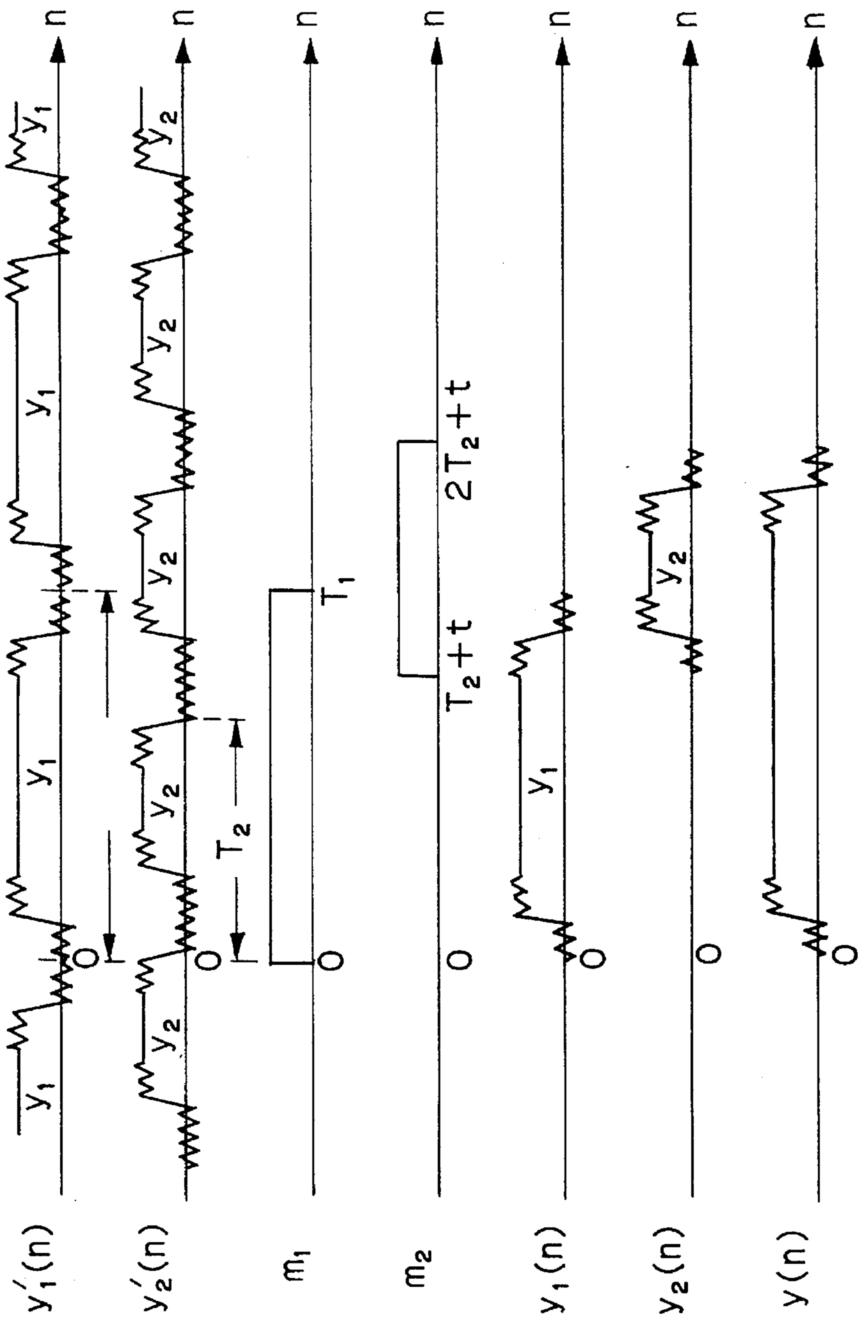
FIGS. 8(*a*)–8(*g*) are explanatory waveform charts explaining an operation of the embodiment shown in FIG. 7.

Referring to FIGS. 7 and 8(*a*)–8(*g*), another embodiment of the present invention will be described. In FIG. 7, the same numerals as in FIG. 3 denote the same elements as those in FIG. 3, and numeral 3' denotes a ring counter to provide cyclic lower address signals $ADD_{L1}$ and $ADD_{L2}$ and numeral 6 a masking circuit incorporated between the memories $\mathbf{1}_1$ and $\mathbf{1}_2$ and the adder 5. The masking circuit 6 comprises gate circuits $\mathbf{61}_1$ and $\mathbf{61}_2$, and a mask canceling signal generating circuit 62.

The operation of the embodiment shown in FIG. 7 will now be explained. The sub-signals $y_1(n)$ and $y_2(n)$ to be generated have been stored, for instance from address 0 to address $T_1(ADD)$ and $T_2(ADD)$ in regions assigned by the upper address signals $ADD_{U1}$ and $ADD_{U2}$ from the pattern selecting circuits $\mathbf{2}_1$ and $\mathbf{2}_2$, respectively, and further the lower address signals $ADD_{L1}$ and $ADD_{L2}$ from the ring counter 3' assign the addresses 0 through $T_{1(ADD)}$ of in any region of the memory $\mathbf{1}_1$ and addresses 0 through $T_{2(ADD)}$ in any region of the memory $\mathbf{1}_2$, respectively.

When the pattern selecting circuits $2_1$ and $2_2$ and ring counter 3' are rendered active to output the upper address signals $ADD_{U1}$ and $ADD_{U2}$ and the lower address signals $ADD_{L1}$ and $ADD_{L2}$, since the lower address signals are cyclic, the sub-signals $y_1(n)$ and $y_2(n)$ are repeatedly read out at cycles $T_1$ and $T_2$ from the memories $1_1$ and $1_2$ and provided as cyclic sub-signals $y_1'(n)$ and $y_2'(n)$ as shown in FIGS. 8(*a*) and 8(*b*) to the gate circuits $61_1$ and $61_2$ of the masking circuit 6.

The mask canceling signal generating circuit 62 of the masking circuit 6 monitors the lower address signals $ADD_{L1}$ and $ADD_{L2}$ output from the ring counter 3' and outputs mask canceling signals $m_1$ and $m_2$ to the gate circuits $61_1$ and $61_2$, respectively, as explained in below. During reading out the cyclic sub-signals $y_1'(n)$ and $y_2'(n)$ from the memories $1_1$ and $1_2$ as shown in FIGS. 8(*a*) and 8(*b*), a time point when addresses 0 in the regions selected by the upper address bits of the memories $1_1$ and $1_2$ coincide with each other appears repeatedly. The cycle of the zero coincide time points is the least common multiple of the cycles $T_1$ and $T_2$ of the sub-signals $y_1(n)$ and $y_2(n)$. The mask canceling signal generating circuit 62 detects the zero coincide time point, and provides the mask canceling signal $m_1$ to gate circuit $61_1$ to open it for the time period $T_1$ from the detected zero coincide time point (0) as shown in FIG. 8(*c*) and the mask canceling signal $m_2$ to the gate circuit $61_2$ to open it for the time period $T_2$ from the time point ($T_2$+t) to the time point ($2T_2$+t) as shown in FIG. 8(*d*). Here, t=(M−1)/2. Accordingly, the gate circuits $61_1$ and $61_2$ allow the sub-signals $y_1'(n)$ and $y_2'(n)$, to pass therethrough to the adder 5 as shown in FIGS. 8(*e*) and 8(*f*), respectively, and the adding operation is effected at the adder 5 to output an output signal y(n) as shown in FIG. 8(*g*).

Figure 9:
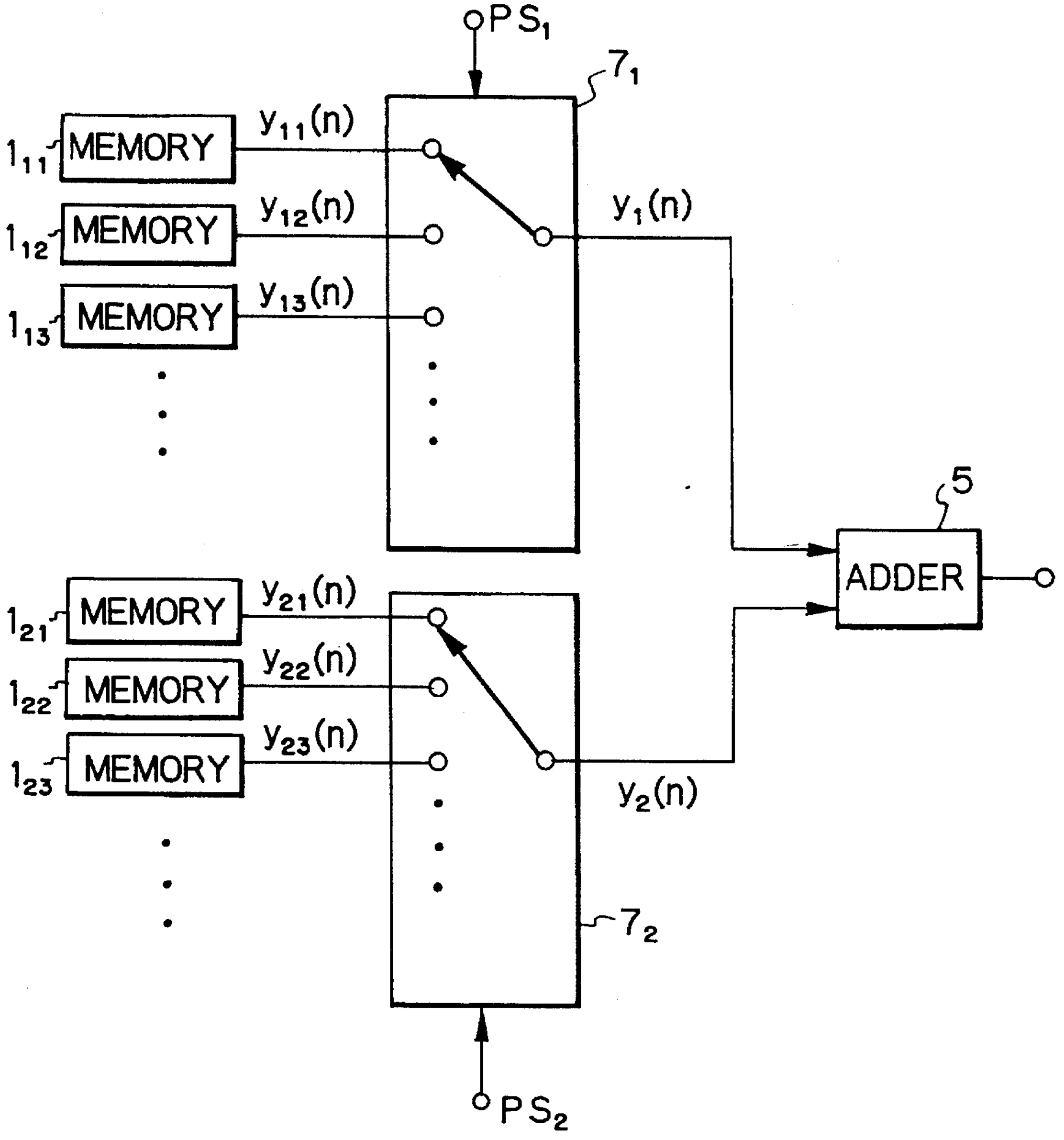
FIG. 9 is a block diagram showing another embodiment of the present invention.

In the above embodiments, a plurality of selectable patterns of one sub-signal are stored in one memory and each pattern is selected by the pattern selecting signal from the pattern selecting circuit or by assigning upper address bits of the memory. Instead of such a construction, however, it may be constructed such that one sub-signal pattern is stored in one memory and that sub-signal patterns each so stored are selectively led to the adder after they have been read out from the memories. In other words, as shown in FIG. 9, sub-signal member $y_{11}(n)$, $y_{12}(n)$, $y_{13}(n)$, . . . , of the sub-signal $y_1(n)$ having different patterns have been stored in respective memories $1_{11}$, $1_{12}$, $1_{13}$, . . . and sub-signal members $y_{21}(n)$, $y_{22}(n)$, $y_{23}(n)$, . . . of the sub-signal $y_2(n)$ having different patterns have been stored in respective memories $1_{21}$, $1_{22}$, $1_{23}$ . . . . These signals may be read out and selected by selection gates $7_1$ and $7_2$ based on pattern selecting signals $PS_1$ and $PS_2$ so as to be led to the adder 5. In this modification, only one of the sub-signals $y_1(n)$ and $y_2(n)$ may be stored in the different memories for the patterns and the other sub-signal may be stored in one memory without being divided into the patterns.

Figure 3:
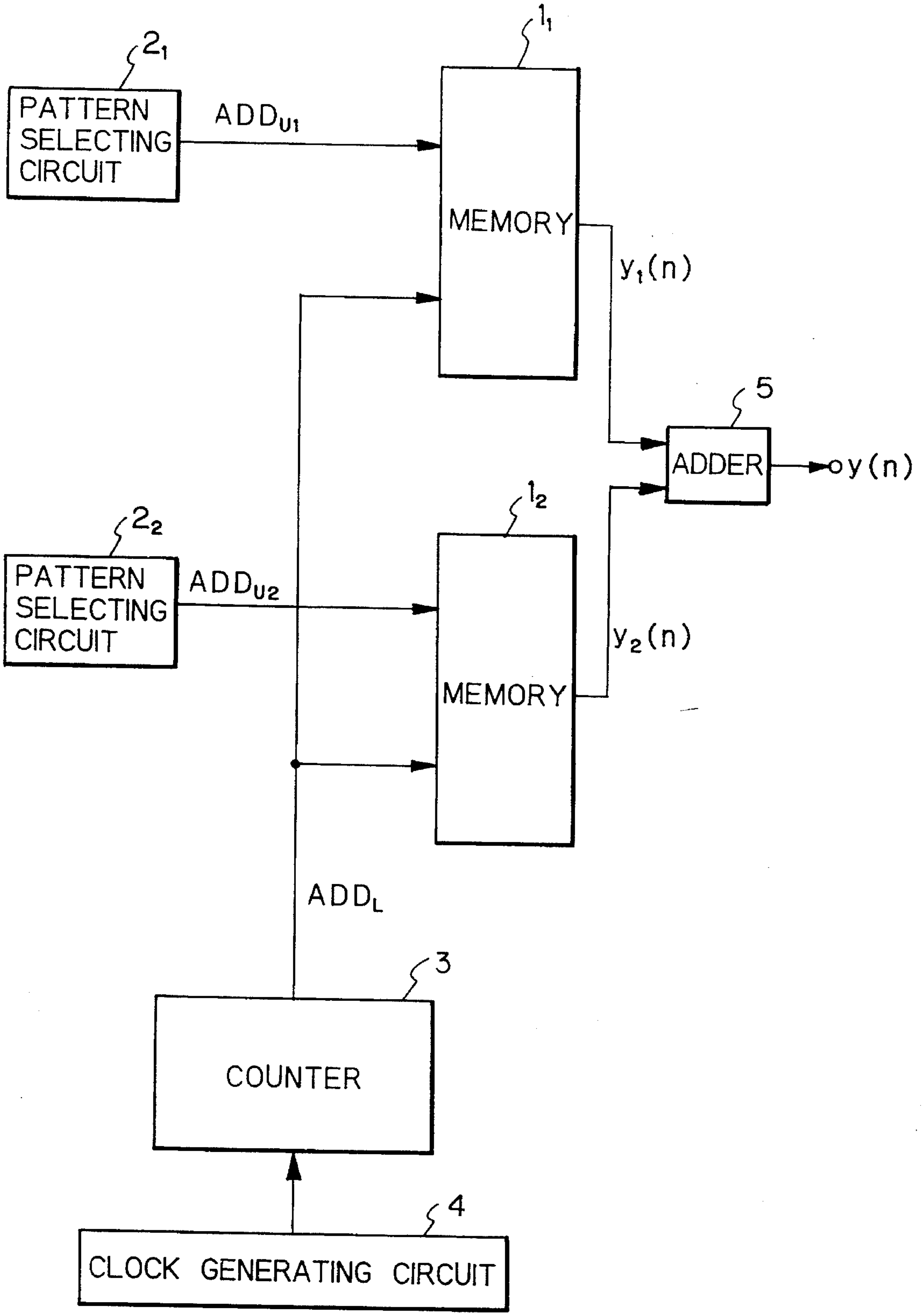
FIG. 3 is a block diagram showing a constitution of an embodiment of the present invention.
Figure 5A:
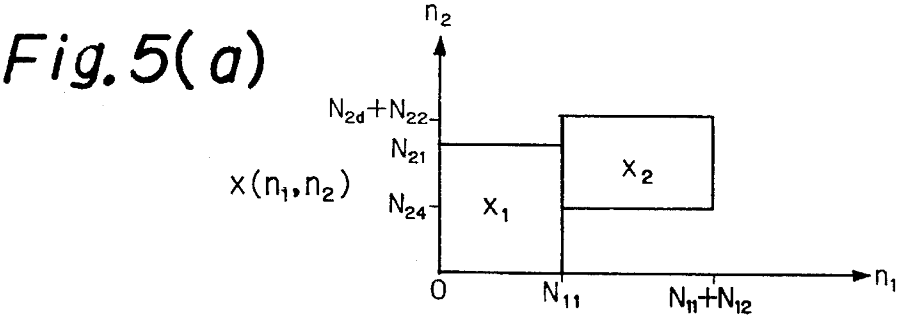
FIGS. 5(*a*)–5(*d*) are explanatory diagrams explaining an adding period of time when the present invention is adopted a generator of a linearly filtered two-dimensional composite signal.
Figure 5B:
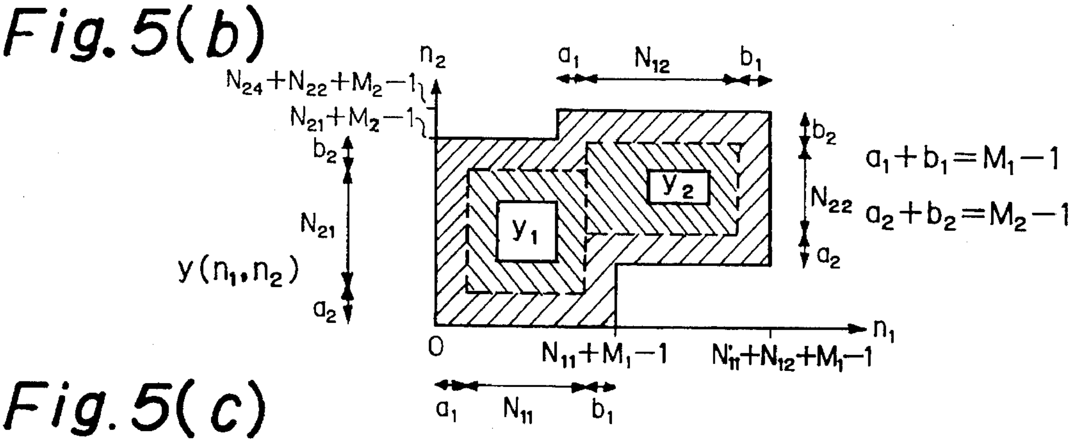
Figure 5C:
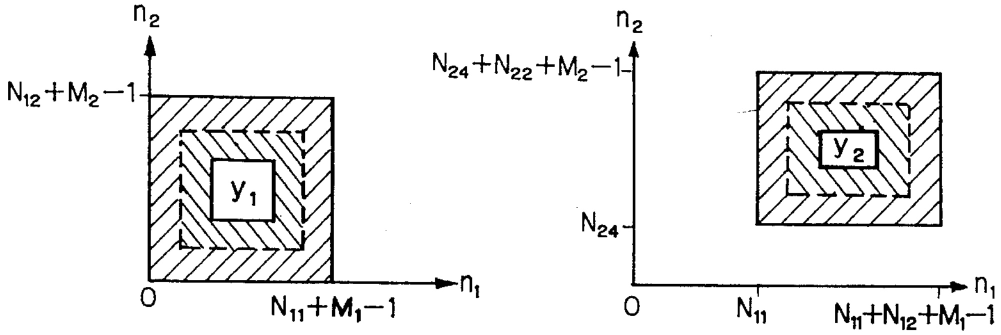
Figure 5D:
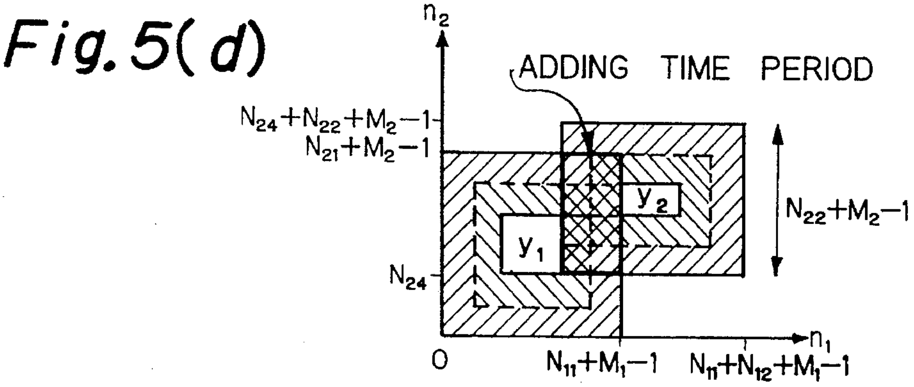

Described in the above descriptions of the embodiments made with reference to FIGS. 3, 7 and 9, are the following summarized methods:

(a) only valid linearly filtered sub-signals have been stored in respective memories, reading out timing of sub-signals from the corresponding memories are controlled, and the read out sub-signals are supplied to an adder (FIG. 3);

(b) zero level data also have been stored in portions of memories not storing sub-signals and the respective stored signals are simultaneously read-out from the memories to be supplied to an adder (FIG. 3); and (c) sub-signals are always repeatedly read out from the corresponding memories and the signals so read out are selectively sent to an adder by means of the gate means (mask circuit 6 in FIG. 7, and selection gates $7_1$, $7_2$ in FIG. 9) provided at the post stage of the memories.

However, the above methods may be combined. For instance, the methods (a) and (c) may be combined so that the reading timing of the sub-signal $y_1(n)$ from the memory $1_1$ is controlled and the read out sub-signal is directly supplied to the adder 5, while sub-signal $y_2(n)$ is repeatedly read-out from the memory $1_2$ and a signal supply timing to the adder 5 is controlled by the gate means disposed at the post stage of the memory $1_2$. In addition, it is apparent that the methods (a) and (b), (b) and (c), or (a) to (c) may be combined. In any of the combinations, it is needless to say that consideration has to be given to the respective operation timings so that the sub-signals are supplied to the adder at desired timings.

Referring to FIGS. 10 and 11, a still further modification of the present invention will be described below. In this modification, a selection switch circuit 8 and a selection switch and adder control circuit 9 are added. The selection switch circuit 8 is provided at the post stage of the adder 5 for alternatively selecting any of the sub-signals $y_1(n)$, $y_2(n)$ on the input terminals of the adder 5 and the output signal from the adder 5, and further the selection switch and adder control circuit 9 is provided for detecting outputs from the counter 3 so as to output control signal C2 to the adder 5 and control signals C1 and C3 to the selection switch circuit 8. The operations of the adder 5 and selection switch circuit 8 are controlled by those control signals so that the adder 5 is put in operation only for a time period needed for an adding process, while at the other time periods the adder is controlled not to operate and either of the signals $y_1(n)$ or $y_2(n)$ is transferred through the selection switch circuit 8, but not through the adder 5, to an output terminal of the apparatus of the present invention.

Explaining in more detail, count values of the counter 3 are monitored at the circuit 9, and the control signals C1, C2 and C3 as shown in FIGS. 11(*d*), 11(*e*) and 11(*f*) are generated. During the control signal C1 is generated, the selection switch circuit 8 is controlled to directly output the sub-signal $y_1(n)$ and the adder 5 is rendered to the non-active condition, during the control signal C2 is generated, the adder 5 is activated and the added signals are output via the selection switch circuit 8, and during the control signal C3 is generated, the selection switch circuit 8 again rendered to the non-active condition and the selection switch circuit 8 is controlled to directly output the sub-signal $y_2(n)$. Accordingly, the output composite signal y(n) is provided as shown in FIG. 11(*g*).

Although the waveform charts shown in FIGS. 11(*a*)–11(*g*) represent a case where there is an interval between the adjacent sub-signals, it is needless to say that the configuration shown in FIG. 10 is applicable to a case where there is no interval therebetween. The configuration shown in FIG. 11 is also applicable to the embodiments shown in FIGS. 3, 7 and 9, respectively.

As described above, the present invention is constituted so that a plurality of original sub-signals $x_1(n)$ and $x_2(n)$ comprising an original signal x(n) have been treated with a linear filter respectively, the filtered sub-signals $y_1(n)$ and $y_2(n)$ have been stored in the corresponding memories respectively, and when a composite signal y(n) obtained by linearly filtering the original signal x(n) is to be generated, the sub-signals $y_1(n)$ and $y_2(n)$ are read out from the memories and added during a predetermined time period centered the sub-signal changing timing. Thus, compared with the prior art, the present invention is capable of saving a memory capacity for storing a linearly filtered composite signal. In particular, according to the present invention, the greater the numbers of sub-signals of a signal and/or patterns of a sub-signals become, the greater the degree of the memory capacity saving effect becomes.

The forgoing detailed description is to be clearly understood as given by way of illustration and example only, and thus the spirit and scope of this invention is limited solely by the appended claims.

What is claimed is:

1. A filtered composite signal generating apparatus for generating a linearly filtered composite signal, wherein the original signal of said composite signal is divided into a plurality of sequentially arranged original sub-signals and intervals between adjacent original sub-signals are within a predetermined time period, and wherein at least one of said sub-signals includes a plurality of selectable patterns, said filtered composite signal generating apparatus comprising:

(a) a plurality of memory means storing filtered sub-signals, including said at least one sub-signal including a plurality of selectable patterns, obtained by linearly filtering said original sub-signals, respectively;

(b) adding means for adding data of said filtered sub-signals read out from said memory means to provide the resultant data to an output terminal of said apparatus; and (c) control means for controlling timings of providing the data of said filtered sub-signals stored in said memory means to said adding means, said control means including pattern selecting means for selecting one of said plurality of selectable patterns, such that, when a first filtered sub-signal is to be generated, the data of said first filtered sub-signal sequentially read out from the corresponding first memory means are provided to said adding means, thereby providing the data of said first filtered sub-signal through said adding means to said output terminal, when a second filtered sub-signal is to be generated in placed of said first filtered sub-signal, during a predetermined time period centered at a switching timing from said first filtered sub-signal, both of data of said first and second filtered sub-signals read out from the corresponding first and second memory means are added at said adding means, thereby providing the added data to said output terminal, and thereafter, only the data of said second filtered sub-signal read out from said second memory means are provided to said adding means, thereby providing the data of said second filtered sub-signal to said output terminal.

2. An apparatus as set forth in claim 1, wherein said control means comprises address generating means for generating respective addresses of said memory means to read out the data of the respective filtered sub-signals therefrom at predetermined different timings.

3. An apparatus as set forth in claim 2, wherein said address generating means generate the addresses repeatedly, thereby said filtered sub-signals are repeatedly read out from said memory means.

4. An apparatus as set forth in claim 1, wherein each of said memory means has stored the data of said filtered sub-signal at predetermined addresses and zero level data at the remaining addresses of one filtered composite signal generation cycle; and said control means comprises address generating means for generating addresses to said memory means to read out the data from said memory means simultaneously during said generation cycle.

5. An apparatus as set forth in claim 4, wherein said address generating means generate the addresses repeatedly, thereby said filtered sub-signals are repeatedly read out from said memory means.

6. An apparatus as set forth in claim 1, wherein said control means comprises:

address generating means for generating addresses to repeatedly read out said respective filtered sub-signals from said memory means at the same time; and means for controlling passing/interrupting of said respective filtered sub-signals read out from said memory means to said adding means.

7. An apparatus as set forth in claim 1, wherein at least one of said memory means has stored data of said filtered sub-signal at predetermined addresses and zero level data at the remaining addresses of one filtered composite signal generation cycle; and said control means comprises address generating means for generating addresses having said generation cycle to the memory means which has also stored zero level data to read out the filtered sub-signal data and zero level data therefrom during the generation cycle, and for generating addresses at predetermined timings to the memory means which have stored no zero level data to read out said filtered sub-signals therefrom.

8. An apparatus as set forth in claim 1, wherein at least one of said memory means has stored data of said filtered sub-signal at predetermined addresses and zero level data at the remaining addresses of one filtered composite signal generation cycle; and said control means comprises (1) address generating means for generating addresses having said generation cycle to the memory means which has also stored zero level data to read out the filtered sub-signal data and zero level data therefrom during the generation cycle, and for generating addresses repeatedly to the memory means which have stored no zero level data to repeatedly read out said filtered sub-signals therefrom, and (2) means for controlling the passing/interrupting of the data read out from at least the memory means which has stored no zero level data.

9. An apparatus as set forth in claim 1, wherein said control means comprises:

address generating means for generating addresses to repeatedly read out data of said sub-signal from at least one of said memory means for a filtered composite signal generation cycle and to read out data of said filtered sub-signals at predetermined timings from the other memory means; and means for controlling passing/interrupting of the data read out from the repeatedly addressed memory means.

10. An apparatus as set forth in claim 1, wherein the number of said sub-signals is three or more;

at least one of said memory means has stored data of said filtered sub-signal at predetermined addresses and zero level data at the remaining addresses of one filtered composite signal generation cycle; and said control means comprises (1) address generating means for generating addresses having said generation cycle to the memory means which has also stored zero level data to read out the filtered sub-signal data and zero level data therefrom during the generation cycle, for generating addresses repeatedly to at least one of the memory means which have stored no zero level data to repeatedly read out data of said filtered sub-signals therefrom, and for generating addresses at predetermined timings to the other memory means to read out the data of said filtered sub-signals therefrom, and (2) means for controlling the passing/interrupting of data of the repeatedly read out sub-signal from the memory means which has stored no zero level data.

11. An apparatus as set forth in claim 1, further comprising:

input nodes and an output node associated with said adding means, output selecting means for selectively connecting one of said input nodes and said output node of said adding means to said output terminal of said apparatus, and means for controlling the operations of said output selecting means and said adding means such that only for said predetermined time period centered at the sub-signal switching timing, it renders said adding means active and said output selecting means to connect the output node of said adding means to the output terminal of said apparatus, and for the other time period, it renders said output selecting means to selectively connect one of said input nodes of said adding means to said output terminal in accordance with the filtered sub-signal to be generated.

12. An apparatus as set forth in claim 1 wherein at least one of said intervals between said adjacent original sub-signals is null (zero).

13. An apparatus as set forth in claim 1, wherein said pattern selecting means comprises upper address generating means for generating upper bits of addresses of the memory means storing the sub-signals having said patterns.

14. An apparatus as set forth in claim 1, wherein the memory means storing the sub-signals having said patterns consists of a plurality of memories respectively storing said patterns, and said pattern selecting means comprises alternative selection gate means disposed between said memories and said adding means for alternatively connecting one of outputs of said memories to said input node of said adding means.

15. A filtered composite signal generating method for generating a linearly filtered composite signal, wherein the original signal of said composite signal is divided into a plurality of sequentially arranged original sub-signals and intervals between adjacent original sub-signals are within a predetermined time period, and wherein at least one of said sub-signals includes a plurality of selectable patterns, said method comprising the steps of:

(a) providing a plurality of memory means storing data of filtered sub-signals obtained by linearly filtering said original sub-signals, respectively, said sub-signals including said at least one sub-signal having a plurality of selectable patterns;

(b) reading out data of a first filtered sub-signal from a first memory means and outputting it from an output terminal;

(c) selecting a signal pattern from said plurality of selectable patterns;

(d) reading out data of said first and a second filtered sub-signals from said first and a second memory means during a predetermined time period centered at a signal switching timing from said first filtered sub-signal to said second filtered sub-signal, adding the read out data, and outputting the resultant data from said output terminal; and (e) thereafter, reading out the data of said second filtered sub-signal from said second memory means and outputting it from said output terminal.

16. A filtered composite signal generating method for generating a linearly filtered composite signal, wherein the original signal of said composite signal is divided into a plurality of sequentially arranged original sub-signals and intervals between adjacent original sub-signals are within a predetermined time period, and wherein at least one of said sub-signals includes a plurality of selectable patterns, said method comprising the steps of:

(a) providing a plurality of memory means respectively storing data of filtered sub-signals obtained by linearly filtering said original sub-signals at predetermined addresses, and zero level data at the remaining addresses of a filtered composite signal generation cycle, said sub-signals including said at least one sub-signal having a plurality of selectable patterns; and (b) selecting one of said plurality of selectable signal patterns;

(c) reading out data of said filtered sub-signals and zero level data from said memory means simultaneously, adding the read out data, and outputting the resultant data from said output terminal.

17. A filtered composite signal generating method for generating a linearly filtered composite signal, wherein the original signal of said composite signal is divided into a plurality of sequentially arranged original sub-signals and intervals between adjacent original sub-signals are within a predetermined time period, and wherein at least one of said sub-signals includes a plurality of selectable patterns, said method comprising the steps of:

(a) providing a plurality of memory means storing data of filtered sub-signals obtained by linearly filtering said original sub-signals, respectively, said sub-signals including said sub-signals including said at least one sub-signal having a plurality of selectable patterns;

(b) selecting one of said plurality of selectable signal patterns;

(c) repeatedly reading out data of the filtered sub-signals from all the memory means, simultaneously;

(d) transferring the read out data of said first filtered sub-signal, and outputting it from an output terminal;

(e) transferring the read out data of said first a second filtered sub-signals from said first and a second memory means during a predetermined time period centered at a signal switching timing from said first sub-signal to said second filtered sub-signal, adding the transferred data, and outputting the resultant data from said output terminal; and (f) thereafter, transferring the read out data of said second filtered sub-signal from said second memory means and outputting it from said output terminal.

18. A method as set forth in claim 15 wherein at least one of said intervals between said adjacent original sub-signals is null (zero).

19. A method as set forth in any one of claims 15–18, wherein said pattern selecting step is executed by addressing upper bits of addresses of the memory means.

20. A method as set forth in any one of claims 15–18, wherein said memory means storing said filtered sub-signal having said patterns comprises a plurality of memories, which have respectively stored said patterns, and said pattern selecting step is executed by alternatively selecting outputs of said memories.

* * * * *